*L. Blacklidge,*
*Walking Planter.*
No. 107,436. Patented Sep. 20, 1870.
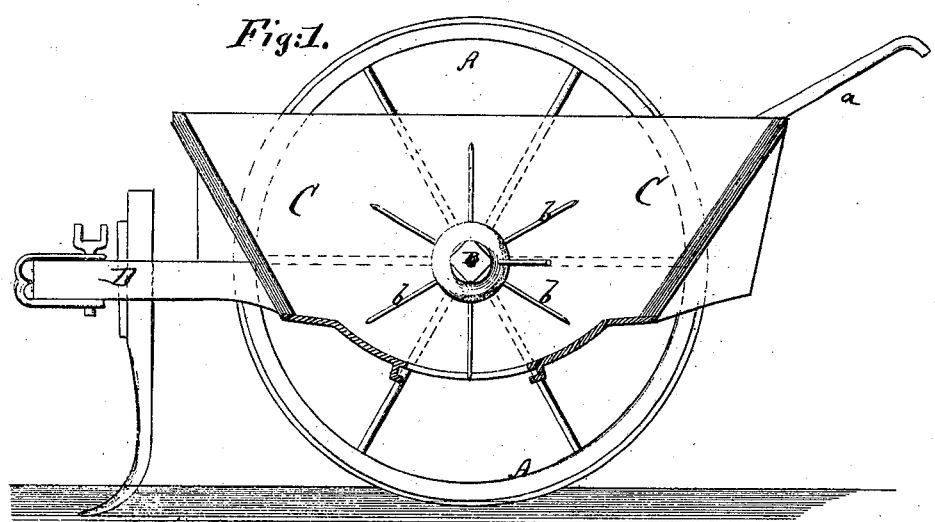
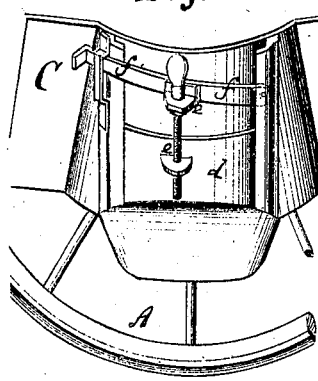
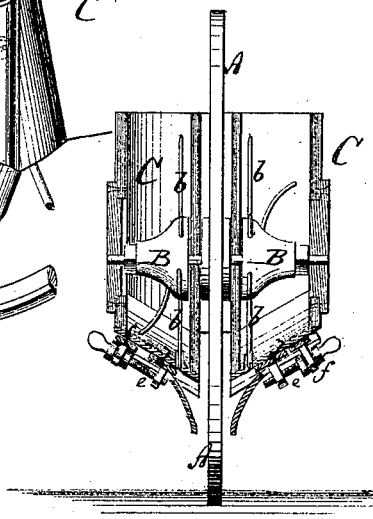
Witnesses:
M. Vorlaender
G. S. Mabee
Inventor:
L. Blacklidge
per
Attorneys.

UNITED STATES PATENT OFFICE.

EDWARD BLACKLIDGE, OF ABBEVILLE, ALABAMA.

Letters Patent No. 107,436, dated September 20, 1870.

IMPROVEMENT IN SEED AND GUANO-DISTRIBUTERS.

The Schedule referred to in these Letters Patent and making part of the same.

*To all whom it may concern:*

Be it known that I, EDWARD BLACKLIDGE, of Abbeville, in the county of Henry and State of Alabama, have invented a new and improved Seed-Planter and Guano-Distributer; and I do hereby declare that the following is a full, clear, and exact description thereof, which will enable others skilled in the art to make and use the same, reference being had to the accompanying drawing forming part of this specification, in which—

Figure 1 represents a side elevation, partly in section, of my improved seed and guano-planter.

Figure 2 is a vertical transverse section of the same.

Figure 3 is a detail side view of the same.

Similar letters of reference indicate corresponding parts.

This invention relates to improvement in the class of seed-planters which is provided with two hoppers placed side by side; and The improvement consists in a certain construction and arrangement of wheel-agitators, seed-hoppers, and seed-slides, as specified in the claim.

A in the drawing represents the main supporting-wheel of the planter.

It is mounted upon an axle, B, which has its bearings in and is fitted through two hoppers or boxes, C C.

The upper part of the wheel A is thus concealed between said hoppers.

The handles *a a* of the planter project from the rear ends of the hoppers, as shown.

From the axle B, within each hopper, project arms or stirrers *b b*, which serve to gradually and evenly discharge the seed or fertilizer through the openings in the bottom of each hopper.

A slot or discharge-opening is provided in the bottom of each hopper, for the discharge of the contents.

The size of this slot is regulated by a slide, *d*, which can be adjusted by means of a suitable screw, *e*.

This screw is swiveled in ears projecting from a pivoted spring lever, *f*, by means of which the slide can be entirely closed or opened, when desired.

The apparatus thus constructed can be cheaply made, and is not liable to get out of order by the accumulation of dust on any of its parts.

Suitable furrowing or covering-tools may be applied to the instrument on any desired part of the same.

The draft-bar D is or may be forked at its rear end, to be secured to both hoppers.

I am aware, as hereinbefore intimated, that the arrangement of a wheel centrally between two seed-hoppers is not new, but such wheels have not formed the only support of the planter upon the ground, nor have the agitating-arms and partitions been similarly arranged.

It is desirable to drop the seed and guano simultaneously, and to deliver them mingled together in the furrow, as well as to provide separate adjusting devices for regulating the quantity of each discharge.

I am enabled to adjust the seed-slide with great nicety, by aid of screws, and, when desired, can instantly shut off the delivery of seed altogether.

Having thus described my invention,

I claim as new and desire to secure by Letters Patent—

1. The arrangement, with the slide *d*, of the pivoted lever *f* with the adjusting-screw *e*, working in lugs of said lever and slide, as shown and described, for the purpose specified.

2. The arrangement of the transporting-wheel A, agitators *b*, hub B, and separate hoppers C, as shown and described.

EDWARD BLACKLIDGE.

Witnesses:
  J. H. SIMONTON,
  J. A. CLENDINEN.